United States Patent [19]

Shaffer et al.

[11] 3,771,117
[45] Nov. 6, 1973

[54] TRANSDUCER INSTALLATION

[75] Inventors: Thomas N. Shaffer, Silver Spring; Charles R. Wilson, Glen Burnie; Lawrence G. Wright, Pasadena, all of Md.

[73] Assignee: Westinghouse Electric Corporation, Pittsburgh, Pa.

[22] Filed: Mar. 1, 1972

[21] Appl. No.: 230,719

[52] U.S. Cl. .................................. 340/8 R, 310/9.1
[51] Int. Cl. ........................................ H04b 13/00
[58] Field of Search ...................... 340/8, 9, 10, 12, 340/13; 73/71.5 U, 194 A; 181/.5 NP; 310/9.1, 8.2

[56] References Cited
UNITED STATES PATENTS

| | | | |
|---|---|---|---|
| 3,167,150 | 1/1965 | Darby et al. | 340/10 X |
| 3,277,435 | 10/1966 | Thompson et al. | 340/10 |
| 2,773,996 | 12/1956 | Slater | 340/10 X |
| 3,469,445 | 9/1969 | Moffatt | 73/194 A |
| 2,803,807 | 8/1957 | Butler | 340/8 R |

Primary Examiner—Benjamin A. Borchelt
Assistant Examiner—H. J. Tudor
Attorney—F. H. Henson et al.

[57] ABSTRACT

A transducer assembly holder is mounted through the wall of a fluid conveying structure and includes an acoustic window in communication with the fluid. A transducer assembly is positioned within the holder and has a transducer active element encapsulated in an elastomeric material. The assembly is positioned up against the window of the holder and a spring force is applied to the assembly through a spacer tube or rod. The arrangement is such that the spring force is transferred evenly over the encapsulating elastomeric material and a pressure bond is created between the transducer active element and the acoustic window, such couplings being essential for proper transducer operation.

18 Claims, 4 Drawing Figures

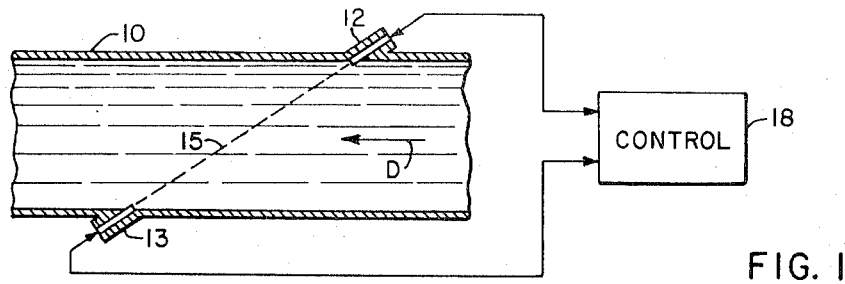
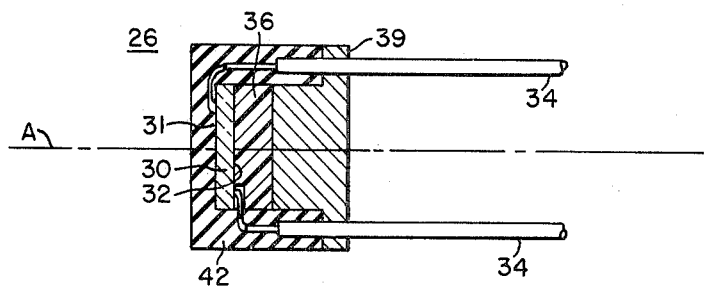
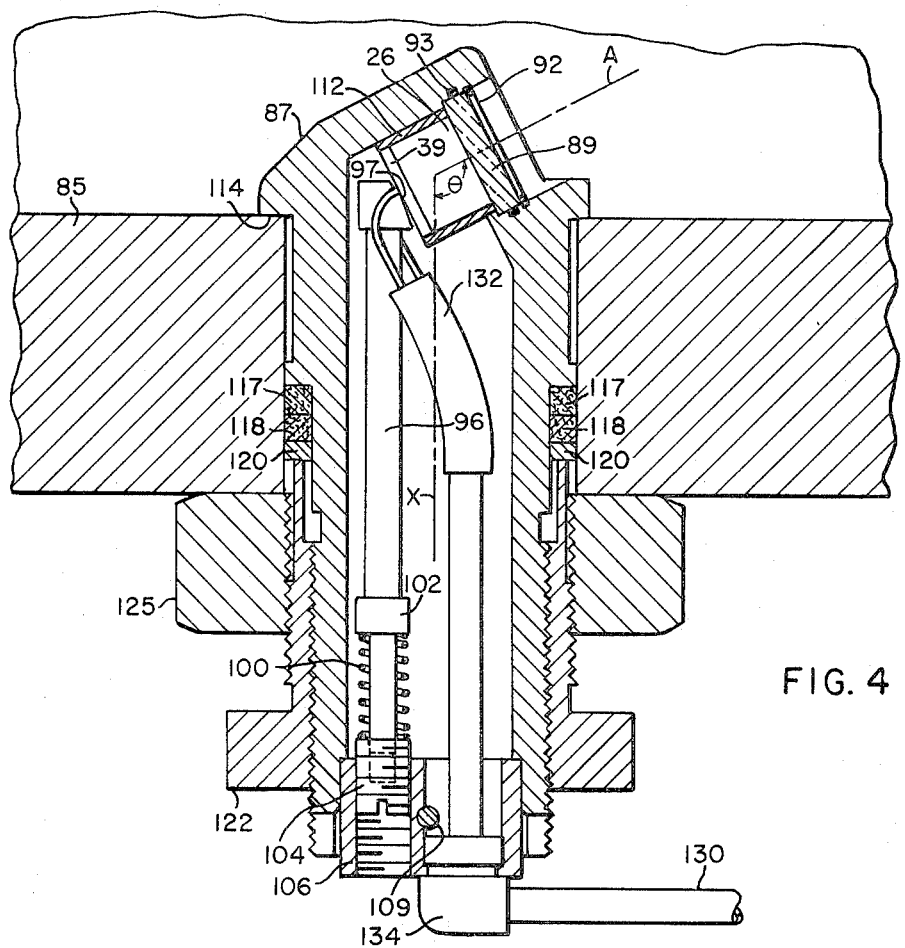

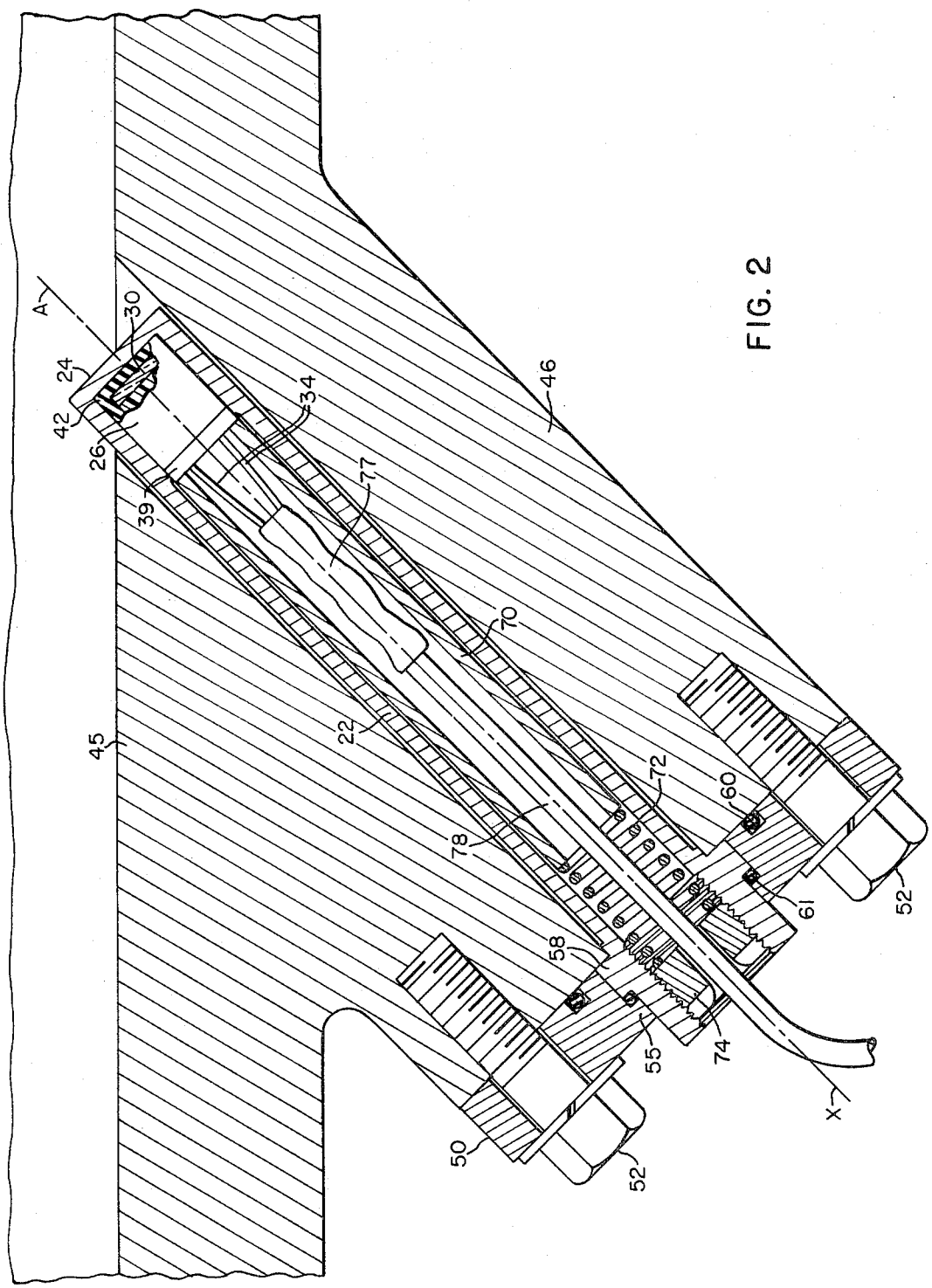

3,771,117

TRANSDUCER INSTALLATION

BACKGROUND OF THE INVENTION

1. Field of the Invention

The invention in general relates to acoustic transducers and housings therefor, and particularly to an arrangement for use in fluid flow measuring systems.

2. Description of the Prior Art

Transducer installations generally include a transducer active element which transmits and/or receives acoustic energy. The active element is encapsulated or is bonded to a plastic cup such as an acrylic in order to isolate the active element and associated wires from the fluid medium. One such general arrangement, although not used for a fluid medium, is illustrated in U.S. Pat. No. 3,167,150. A problem occurs that with use, and in time, the bond between the active element and the cup tends to fail, severely weakening or else destroying the acoustic signals. It then becomes necessary to dismantle the entire installation in order to replace the active element.

In another type of arrangement, acoustic flow meters are utilized in systems for measuring fluid flow in open channels as well as in closed conduits of all types and sizes. The systems utilize one or more pairs of acoustic transducers mounted in the walls of the conduit or channel in upstream and downstream locations and are operated such that the transducers transmit and receive acoustic signals through the fluid toward and from one another.

The difference in arrival times at the respective upstream and downstream locations is sensed, and is an indication of fluid velocity and may be utilized to calculate the volume flow in a conduit.

Transducers for use in such systems are of the type previously mentioned wherein the transducer active element is either encapsulated in plastic or bonded to a plastic container through which the acoustic signals are transmitted. In many installation designs, the transducers could not be replaced readily and in others the entire system had to be drained in order to replace an active element. In systems having relatively small diameter pipes, fluid flow can be shut off by closing one or two valves, however, in large hydroelectric installations the matter of shutting down is a more serious one.

SUMMARY OF THE INVENTION

A transducer installation according to the invention includes a transducer assembly holder which has a window at one end thereof for passage of acoustic energy. Fitted within the holder is a transducer assembly having an active transducer element with suitable backing means and an elastomeric encapsulant material covering it. Elastomeric material is positioned against the inside of the acoustic window and a thrust force is applied to the transducer assembly urging it into tight engagement with the window.

The assembly holder is mounted to a wall of a fluid handling structure with a plurality of fluid seals. A transducer assembly is readily removable from the rear of the assembly holder so that the fluid system does not have to be drained to accomplish transducer replacement.

BRIEF DESCRIPTION OF THE DRAWINGS

FIG. 1 illustrates one type of fluid measuring system in which the present invention may be utilized;

FIG. 2 is a cross-sectional view of one type of transducer installation;

FIG. 3 is a cross-sectional view of a transducer assembly; and

FIG. 4 is a cross-sectional view of another type of transducer installation.

DESCRIPTION OF THE PREFERRED EMBODIMENT

Although the present invention can be utilized in a variety of fluid handling structures and underwater applications, it will be described with respect to a fluid flow meter system, one example of which is illustrated in FIG. 1.

Fluid flow direction in conduit 10 is indicated by the arrow D. The system includes an upstream transducer installation 12 and a downstream transducer installation 13 each including an active transducer element for providing an extremely narrow beam of acoustic energy along the line 15 directed toward the opposing transducer. The acoustic energy propagated from the unit 12 to the unit 13 will be aided by the flow of fluid whereas the acoustic energy propagated from unit 13 to unit 12 will be retarded by the fluid flow and the difference in times of arrival of the two oppositely directed signals will provide an indication of the fluid velocity. The transducer installations 12 and 13 are coupled to a control section 18 which supplies the necessary signals to the respective transducers for transmitting, and also processes the received signals for computing fluid flow.

FIG. 2 illustrates one type of transducer installation which, although not limited thereto, may be utilized for pipes ranging for example up to about 8 or 10 feet in diameter, where the necessary holes may be drilled in conventional machine shop facilities. The installation includes a transducer assembly holder 22 having at one end thereof an acoustic window 24 for the passage of acoustic energy transmitted and/or received by transducer assembly 26 positioned against the inside of the acoustic window 24 and being forcibly pushed against it, as will be described.

In various prior art systems, the active transducer element was either placed against or cemented to an acoustic window. With no bonding, adequate acoustic signal coupling could not be obtained between the element and the window, and with the element cemented to the window the repetitive energization of the element caused stresses to develop in the bond and the bond would fail severely weakening or destroying the acoustic signals.

Reference is made to FIG. 3 illustrating one embodiment of a preferred transducer assembly for use in the transducer installation of FIG. 2. The assembly 26 includes an active transducer element 30 having front and back active surfaces 31 and 32 which will radiate acoustic energy when supplied with energization signals on leads 34. As well known to those skilled in the art, such an active element will also provide an electrical output signal, on leads 34, in accordance with received acoustic energy.

A backing means is provided for the transducer element 30 and includes an absorber 36, which may also be a pressure release material, for the purpose of preventing acoustic waves emanating from the back surface 32 from being reflected back into the element in a manner that interferes with signal production. When supplied with an energizing signal, the active element 30 will then radiate acoustic energy along and about acoustic axis A, and in the receive mode a maximum signal will be provided by the element 30 when incoming acoustic energy is along the axis A, axis A being coincident with line 15 of FIG. 1.

In back of the absorber 36 there is positioned a pressure plate 39 which provides a hard surface for force application, as will be described.

In order to eliminate the loss of bonding between the active element and an acoustic window, there is provided an elastomeric material 42 covering at least the front active surface 31, and preferably extending down the sides of the assembly to the pressure plate 39. The elastomeric encapsulant 42 is compliant to the extent that minimal stresses are developed in the bond between it and the element 30 when the element 30 is repetitively operated. The transducer assembly 26 in addition to being usable at normal temperature may be utilized in high temperature applications by the proper choice of material. A temperature resistant silicone rubber encapsulant may be utilized for both high and normal temperature situations. The absorber 36 for normal temperature operations may be comprised of a clay bead microsphere-acrylic material and tungsten may be utilized for high temperature situations. The pressure plate 39 for such operations may be made of metal, or for normal temperatures may be made of plastic. Any well-known transducer material may be used for the transducer element 30, one such material being barium titanate. For high temperature operation, however, an element made of lead metaniobate is preferred.

The transducer installations are constructed and arranged such that the active transducer element is effectively pressure bonded to the acoustic window of the transducer assembly holder, such coupling being essential to proper transducer operation. In addition, the force urging the transducer assembly into engagement with the acoustic window may be varied and in the event of transducer failure the assembly may be readily removed and replaced without the requirement for system shutdown, and to this end reference is again made to FIG. 2.

Transducer assembly holder 22 extends through an aperture in wall 45 of a fluid handling structure, and which wall has a reinforcement portion 46. The acoustic window end of the transducer assembly holder 22 is communicative with the fluid in the structure and means are provided for fixedly mounting the holder to the wall 45, and more particularly the other, or second, end of the transducer assembly holder 22 is connected to the reinforcement portion 46. This is accomplished by the provision of an end cap 50 secured to the reinforcement portion 46 by means of cap screws 52. The end cap 50 includes an apertured flange portion 55 for cooperative engagement with a rim 58 at the second, or back, end of the transducer assembly holder 22.

Means such as gaskets or O-rings 60, 61 are provided for preventing the fluid within the structure from discharging to the outside of the structure through the aperture in the wall 45.

The transducer assembly holder 22 is generally in the form of an elongated tube extending about a central axis and being closed at one end forming an acoustic window, and being open at the other end. The transducer assembly 26 is inserted in the tube so that it abuts the acoustic window 24 and means are provided for applying a thrust force to the transducer assembly in order to urge it into tight engagement with the window.

The means by which the transducer assembly 26 is urged into signal transfer relationship with the acoustic window includes a force transmittal means extending from the transducer assembly at the first end of the holder to the second end of the holder. The force transmittal means includes a spacer member 70 in the form of a cylinder. A spring force is applied to the transducer assembly through the spacer member by means of spring 72 acting against an abutment means in the form of adjustment screw 74 threadedly engaged with the second end of the transducer assembly holder 22 whereby the spring force may be varied.

The electrical leads 34 of the transducer assembly 26 are joined by means of a splice 77 to electrical cable 78 extending through an aperture in the adjustment screw 74.

The elastomeric encapsulant 42 of the transducer assembly 26 contacts the acoustic window 24 and the inside walls of the holder 22. The pressure plate 39 at the back end of the assembly 26 acts as a piston transferring the spring load evenly over the encapsulating elastomeric. Since the elastomeric is virtually incompressible, the pressure plate 39 shows little or no longitudinal movement as force is applied. The elastomeric acts like a fluid exerting equal force in all directions and a pressure bond is created between the transducer element 30, the elastomeric encapsulant 42, and the transducer assembly holder 22, including the acoustic window 24.

Changes in the physical properties of the encapsulant due to aging do not significantly affect transducer operation since the encapsulant merely acts as a fluid for conducting acoustic signals. If there should be any voids in the assembly, the elastomeric encapsulant will in time tend to fill in the voids. Over any period of time the spring 72 will take up any slack, thereby maintaining a substantially constant pressure on the elastomeric encapsulant. Replacement of the transducer assembly 26 is readily accomplished without the need for draining the fluid from the structure, simply by removing the adjustment screw 74 and pulling out the spring 72, spacer member 70, and the transducer assembly. A new assembly may then be inserted in the holder 22, pushed into place by spacer members 70 and the adjustment screw 74 may be threaded down on the spring 72 to provide the proper spring force to yield a pressure on the transducer assembly of 100–200 psi, by way of example.

The longitudinal axis X of the transducer assembly holder 22 is substantially colinear with the acoustic axis A of the transducer. In FIG. 4 there is illustrated another embodiment of the invention where the acoustic axis and the longitudinal axis are at an angle $\theta$ with respect to one another, where $\theta$ is less than 180°. The arrangement of FIG. 4 is applicable for existing structures where holes through the structure wall 85 may be drilled in the field.

The installation includes an elongated transducer assembly holder 87 having at the fluid end thereof an acoustic window 89. As a variation, and as illustrated in FIG. 4, the acoustic window instead of being an integral part of the transducer assembly holder can be made of a different material therefrom and may be placed in its proper position and held there by means of a retaining ring 92. A suitable O-ring seal 93 is provided to maintain fluid integrity.

The transducer assembly 26, previously described, is forcibly positioned against the acoustic window 89 by means of a spacer member in the form of rod 96 having a beveled portion 97 at the end thereof for bearing against the pressure plate 39.

One end of a spring 100 bears against a shoulder portion 102 of the rod 96 and the other end bears against an adjustment screw 104 threadedly engaging plug member 106, held in position by means of retaining pin 109.

The transducer assembly holder 87 may be fabricated such that the transducer assembly 26 fits snugly into its upper portion as previously described. Alternatively, and as illustrated in FIG. 4, the transducer assembly 26 may be inserted in a retaining sleeve 112 fitted into the upper portion of the holder 87.

To install the apparatus, the transducer assembly holder 87 is inserted through the wall 85 after a suitable aperture has been drilled, and engages the fluid side of the wall by virtue of shoulder portion 114. In order to prevent leakage of fluid to the outside, there is provided packing rings 117 and 118 held in position by means of, for example a brass packing gland 120 and gland nut 122 threadedly engaged on the transducer assembly holder 87. A lock nut 125 which is threadedly engaged with the gland nut 122 secures the installation to the wall 85.

Lead in cable 130 makes electrical connection with the leads 34 by way of splice 132 and enters the transducer assembly holder 87 by way of a strain relief bushing 134 and the plug member 106.

As was the case with respect to FIG. 2, the transducer installation of FIG. 4 provides a much improved acoustic coupling and the transducer assembly 26 may be readily replaced by simply removing the retaining pin 109, and pulling out the plug member 106 to thereby remove the rod 96 spring 100 combination and the transducer assembly in the sleeve 112.

We claim:

1. A transducer installation comprising:
   A. a transducer assembly holder having a window at one end thereof for passage of acoustic energy;
   B. a transducer assembly including a transducer element having front and back active surfaces, backing means therefor and an elastomeric encapsulant material covering at least said front surface;
   C. said transducer assembly being positioned within said transducer assembly holder with said elastomeric material being positioned against the inside of said window;
   D. means for applying a thrust force to said transducer assembly urging it into engagement with said window.

2. Apparatus according to claim 1 wherein:
   A. said transducer installation is for a fluid handling structure having wall portions; and including
   B. means for fixedly mounting said transducer assembly holder to a wall of said structure;
   C. the outside of said window being communicative with said fluid.

3. A transducer installation for a fluid handling structure having wall portions, comprising:
   A. an elongated transducer assembly holder having first and second ends and having at its first end a window for passage of acoustic energy;
   B. means for fixedly mounting said transducer assembly holder to a wall of said structure;
   C. a transducer assembly positioned within said transducer assembly holder against said window, for acoustic energy transfer relationship with said fluid;
   D. force transmittal means extending from said second end of said transducer assembly holder to said transducer assembly;
   E. abutment means positioned proximate said second end of said transducer assembly holder for applying a force to said force transmittal means;
   F. said abutment means being removably connected whereby a transducer assembly may be readily replaced.

4. Apparatus according to claim 3 wherein:
   A. said transducer assembly includes a transducer element having front and back active surfaces, backing means therefor, and an elastomeric encapsulant material covering at least said front surface.

5. Apparatus according to claim 4 wherein:
   A. said backing means includes a pressure plate upon which said force transmitted means acts.

6. Apparatus according to claim 5 wherein:
   A. said backing means includes acoustic absorbing means interposed between said pressure plate and said transducer element and contacting said back surface thereof.

7. Apparatus according to claim 5 wherein:
   A. said backing means includes acoustic pressure release material interposed between said pressure plate and said transducer element and contacting said back surface thereof.

8. Apparatus according to claim 3 wherein:
   A. said force transmittal means includes a spring; and
   B. said abutment means includes an adjustment screw for adjusting the force of said spring.

9. Apparatus according to claim 8 wherein:
   A. said force transmittal means includes a spacer member extending between said spring and said transducer assembly.

10. Apparatus according to claim 8 wherein:
    A. said adjustment screw is positioned within said transducer assembly holder at the second end thereof.

11. Apparatus according to claim 3 wherein:
    A. said window is an integral end of said transducer assembly holder.

12. Apparatus according to claim 3 wherein:
    A. said window is inserted and retained at the first end of said transducer assembly holder.

13. Apparatus according to claim 3 wherein:
    A. said transducer assembly holder extends through an aperture in a wall of said fluid handling structure and is in direct communication with said fluid; and
    B. said transducer assembly holder is secured to said wall from the outside thereof.

14. Apparatus according to claim 13 which includes:
    A. sealing means for preventing fluid within said structure from discharging to the outside, through said aperture in said wall.

15. Apparatus according to claim 3 wherein:
    A. said acoustic energy transfer is generally along an acoustic axis;
    B. said elongated transducer assembly holder has a central longitudinal axis; and C. said acoustic axis and said longitudinal axis being colinear.

16. Apparatus according to claim 3 wherein:
A. said acoustic energy transfer is generally along an acoustic axis;
B. said elongated transducer assembly holder has a central longitudinal axis; and
C. said acoustic axis and said longitudinal axis being at an angle $\theta$, where $180° > \theta$.

17. Apparatus according to claim 16 wherein:
A. said force transmittal means includes a spacer member having a beveled head portion for urging said transducer assembly against said window when said spacer member is axially moved.

18. Apparatus according to claim 4 wherein:
A. said elastomeric encapsulant contacts said backing means.

* * * * *